United States Patent Office 2,871,156
Patented Jan. 27, 1959

2,871,156
VETERINARY COMPOSITIONS CONTAINING BENZOXAZOLE-TYPE COMPOUNDS AND METHODS FOR USING SAME

Theo A. Hymas, Midland, Mich., assignor to The Dow Chemical Company, Midland, Mich., a corporation of Delaware No Drawing. Application November 2, 1954
Serial No. 466,453

13 Claims. (Cl. 167—53)

This invention relates to animal husbandry and is particularly concerned with a method and composition for the control of gastro-intestinal parasites.

Domestic animals are subject to attack by a number of different gastro-intestinal parasites. Certain of these parasites are minute protozoan organisms known as coccidia. These protozoan organisms are the causative agents of coccidiosis which is a particularly prevalent and destructive disease of fowl such as chickens, turkeys and geese. The disease is also found in dogs, pigs, lambs, calves and other domesticated animals.

The coccidia invade and multiply in various organs but particularly in the alimentary or digestive tract of their host. During the process of growth and multiplication they erode the epithelial tissue of the cecum and intestine bringing about anemia, weakness, serious digestive disturbances, intestinal hemorrhage and intestinal necrosis. Animals, if they do not rapidly succumb to the infection are oftentimes rendered economically unfit by chronic forms of the disease.

Numerous remedies have been suggested and made available for the control of parasitic diseases of the gastro-intestinal tract of animals. Their administration often has been through the water or feed for the animals. Many of these materials are of little efficacy, while others are too expensive or too toxic for prophylactic administration. One of the difficulties encountered in such administration has been the adverse effect which certain of the materials have upon the animals in retarding growth. Another difficulty has been the poisoning of the blood-forming organs and a subsequent reduction in the number of red and white blood cells throughout the body. These effects have made the use of many remedies hazardous and unprofitable. The need for inexpensive prophylactic methods for the suppression of coccidial infection is well recognized as this disease constitutes one of the major problems confronting the poultry industry.

It is an object of the present invention to provide a new and improved practice for raising and benefiting domesticated animals or fowl. A further object is to provide a new method for the control of parasitic diseases of the gastro-intestinal tract of animals. Another object is to provide a method for the control of grastro-intestinal parasites in animals. An additional object is the provision of a novel method for the control of coccidiosis. A further object is the provision of a method which may be employed prophylactically without adversely affecting the metabolic activity of the animal. Yet another object is the provision of novel feed compositions adapted to be employed in the new practice for raising and benefiting animals. Other objects will become apparent from the following specification and claims.

The new practice of benefiting animals comprises feeding the animals a compound of the formula

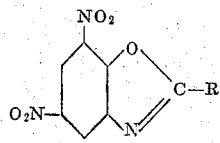

wherein R is halomethyl or lower alkyl to protect them from parasitic diseases of the gastro-intestinal tract and particularly from coccidiosis. The benzoxazole compounds are crystalline solids and inexpensive to prepare. They are not repellent to animals and may be employed in admixture with the feed. They may be administered continuously or intermittently in dosages sufficient to control gastro-intestinal parasites without adversely affecting the metabolic activity or imparting any unpalatable characteristic to the flesh of animals.

The oral administration or feeding of an effective dosage of the benzoxazole compounds is essential for the practice of the present invention. In general, good results are obtained when the animals are fed a daily dosage of from 35 to 2000 milligrams of the benzoxazole compounds per kilogram of body weight. Where prophylactic treatment is desired and the compounds are fed continuously, daily dosages of from 35 to 500 milligrams per kilogram of body weight have been found satisfactory. Where danger of reinfestation from contaminated feed or surroundings is low, good controls are obtained when the animals are fed a daily dosage of 250 milligrams or more per kilogram of body weight for a period of from 2 to 5 days.

The method of the present invention may be carried out by orally administering or feeding the unmodified benzoxazole compounds. However, the present method also embraces the employment of a liquid, powder, pellet, mash or other animal feed composition containing the benzoxazole compounds. In such usage, the compounds may be modified with one or more of a plurality of additaments or innocuous ingestible adjuvants including water, skim milk, alcohol, syrups, edible oils or other liquid carriers; dispersing and emulsifying agents and solid carriers such as edible powders and commercial animal feeds, concentrates or supplements. Such augmented compositions are adapted to be fed animals to supply the desired dosage of active agent or to be employed as concentrates and subsequently diluted with additional carrier to produce the ultimate compositions.

The exact concentration of the benzoxazole compounds to be employed in the compositions may vary provided sufficient of the composition is ingested by the animal as to provide the required dosage of active agent. For example, where individual administration is preferred, liquid or solid compositions containing from 5 to 95 percent by weight may be employed to supply the desired dosage. Where the compounds are provided as a constituent of the sole food ration, satisfactory results are obtained with food rations containing a minor but effective amount of the benzoxazole compounds. The exact amount of the compounds in the ration is dependent upon the total dietary food habits of the animal concerned. In fowl, the required dosages may be supplied with mash compositions containing from 0.01 to 0.4 percent by weight of the active agents. Where the compounds are furnished in the drinking water, good results are obtained at concentrations of the agents in the water equal to one-half those employed when the compounds are supplied as a constituent in the sole food ration. In compositions to be employed as concentrates, the active agents may be present in a concentration of from 5 to 95 percent by weight.

Liquid compositions containing the desired amount of the benzoxazole compounds may be prepared by dissolving the compounds in alcohol or an edible oil, or by dispersing them in water with the aid of a suitable surface active dispersing agent such as an ionic or non-ionic emulsifying agent. Suitable surface active dispersing agents include the glycerol and sorbitan esters of fatty acids and the polyoxyalkylene derivatives of fatty alcohols and of sorbitan esters. The aqueous compositions may contain one or more water-immiscible oils as a solvent for the active ingredient. In such compositions the water, oil and emulsifying agent constitute an aqueous emulsion carrier.

In the preparation of solid feed compositions the benzoxazole compounds may be mechanically ground with an edible solid such as aluminum magnesium silicate. This composition may be fed in the form of capsules or tablets or dispersed in an animal feed and such feed used to supply a part or the entire ration. Alternatively, the benzoxazole compounds may be dissolved in an organic solvent such as alcohol, acetone or methylene chloride, the resulting mixture dispersed in an animal feed and the feed dried to remove the solvent. Also, the compounds may be dissolved in an edible oil such as coconut oil, olive, cotton seed or peanut oil, and the resulting solutions dispersed in the feed. These solid and edible oil compositions may contain one of the aforementioned emulsifying materials as a dispersing agent.

The following examples illustrate the invention but are not to be construed as limiting:

*Example 1*

Twenty-five percent by weight of various of the dinitrobenzoxazoles were separately ground with 75 parts of fuller's earth to prepare compositions which are adapted to be fed to animals or employed as dispersible concentrates. The latter compositions were dispersed in a commercial poultry starting mash to produce medicated feed compositions containing 0.2 percent by weight of one of the agents.

These medicated feed compositions and unmodified starting mash were fed as a sole feed ration to groups of chickens of the same history and past environment. Each such test group consisted of three birds which were two weeks of age. Forty-eight hours after the initiation of the diets, 80,000 sporulated *Eimeria necatrix* oöcyst were introduced directly into the crop of each bird. After the end of the fifth and seventh day following the inoculation, the birds were weighed and the average weight per bird for each test group, determined. During the interval between the fifth and seventh day, the coccidial infection generally causes maximum disturbances in the rate of growth of fowl. Another group of birds was left untreated and uninoculated to serve as an uninfected check. Upon the seventh day the inoculated birds were sacrificed and autopsied. An examination of each bird was made to determine the presence and severity of coccidial disease as evidenced by the presence and extent of intestinal lesions. The average weights per bird at the aforementioned intervals and the autopsy findings for each test group are set forth in the following table:

| Active Agent | Average Weight per Bird in Grams at the Indicated Intervals Following Inoculation | | | Autopsy Finding |
| --- | --- | --- | --- | --- |
| | 0 Days | 5 Days | 7 Days | |
| 2-methyl-5,7-dinitrobenzoxazole (melting at 192°–193° C.) | 400 | 472 | 520 | No coccidial disease. |
| 2-n-propyl-5,7-dinitrobenzoxazole (melting at 78°–80° C.). | 416 | 518 | 568 | Do. |
| Infected checks | 416 | 592 | 534 | All chicks heavily infested with coccidial disease. |
| Uninfected checks | 418 | 622 | 714 | |

*Example 2*

Twenty-five percent by weight of 2-ethyl-5,7-dinitrobenzoxazole (melting at 134°–135° C.) was ground with 75 parts of fuller's earth and the latter concentrate composition thereafter dispersed in a commercial poultry starting mash to produce a medicated feed composition containing various concentrations of the benzoxazole compound.

These medicated feed compositions were ested with unmodified mash in a manner similar to that described in Example 1. In such operations, each bird was fed an inoculum of 12,500 sporulated *Eimeria necatrix* oöcysts and 12,500 *Eimeria tenella* oöcysts. The average weights per bird and the autopsy findings for the test groups are set forth in the following table:

| Percent by Weight of Active Agent in Mash | Average Weight per Bird in Grams at the Indicated Intervals Following Inoculation | | | Autopsy Finding |
| --- | --- | --- | --- | --- |
| | 0 Days | 5 Days | 7 Days | |
| 0.1 | 335 | 497 | 575 | No coccidial infection. |
| 0.05 | 338 | 478 | 556 | Do. |
| Infected checks | 339 | 507 | 467 | All birds heavily infested with coccidial disease. |
| Uninfected checks | 342 | 500 | 562 | |

*Example 3*

The concentrate composition as prepared in Example 2 was dispersed in chicken mash to prepare medicated feed compositions containing 0.05 and 0.025 percent by weight of 2-ethyl-5,7-dinitrobenzoxazole. These medicated compostions and unmodified mash were fed as a sole ration to three flocks of chickens for thirty-nine days. Each flock consisted of forty-eight chickens which were four and one-half weeks of age. Each flock was placed in a separate rearing pen and maintained on cane litter which was heavily infested with the oöcyst of *Eimeria tenella* and *Eimeria necatrix*. At intervals during the determination all of the birds were weighed and the average weight per bird for each flock determined. Any of the birds which died during the period were autopsied and the cause of death determined. The average weight at the end of various feeding intervals and the number of deaths from coccidiosis occurring during the intervals are reported in the following table:

| Age of Chicks in Days | Flock Receiving Mash Containing 0.05 Percent of Active Agent | | Flock Receiving Medicated Mash Containing 0.025 Percent of Active Agent | | Chickens Receiving Unmodified Mash | |
| --- | --- | --- | --- | --- | --- | --- |
| | Average Weight per Bird in Pounds | Deaths From Coccidiosis | Average Weight per Bird in Pounds | Deaths From Coccidiosis | Average Weight per Bird in Pounds | Deaths From Coccidiosis |
| 0 | 0.88 | 0 | 0.87 | 0 | 0.89 | 0 |
| 7 | 1.08 | 0 | 1.15 | 0 | 1.15 | 0 |
| 11 | 1.26 | 0 | 1.32 | 0 | 1.32 | 0 |
| 14 | 1.42 | 0 | 1.48 | 0 | 1.49 | 0 |
| 18 | 1.60 | 0 | 1.68 | 0 | 1.58 | 0 |
| 21 | 1.62 | 0 | 1.48 | 0 | 1.41 | 0 |
| 25 | 1.74 | 0 | 1.43 | 0 | 1.41 | 0 |
| 28 | 1.89 | 0 | 1.62 | 0 | 1.56 | 0 |
| 32 | 2.07 | 0 | 1.87 | 0 | 1.80 | 0 |
| 35 | 2.20 | 0 | 2.05 | 0 | 2.00 | 0 |
| 39 | 2.41 | 0 | 2.26 | 0 | 2.24 | 0 |

*Example 4*

Twenty-five percent by weight of 2-chloromethyl-5,7-dinitrobenzoxazole (melting at 166°–169° C.) was ground with 75 parts of fuller's earth and the latter concentrate composition thereafter dispersed in a commercial poultry starting mash to produce a medicated feed composition containing 0.1 percent by weight of the benzoxazole compound. This composition was tested with modified mash in a manner similar to that described in Example 1. In such operations, 40,000 sporulated *Eimeria necatrix* oöcysts were introduced into the crops of the test groups. Each test group consisted of five birds which were two weeks of age. The autopsy findings and the average weights per bird for each group are set forth in the following table:

| Active Agent | Average Weight per Bird in Grams at the Indicated Intravals Following Inoculation | | | Autopsy Findings |
|---|---|---|---|---|
| | 0 Days | 5 Days | 7 Days | |
| 2-chloromethyl-5,7-dinitrobenzoxazole. | 111 | 165 | 189 | Faint trace of coccidial disease in one chick. |
| Infected controls | 111 | 166 | 150 | All chicks heavily infested with coccidial disease. |
| Uninfected controls | 112 | 137 | 190 | |

*Example 5*

The concentrate compositions of Examples 1 and 2 containing 25 percent by weight of 2-methyl-5,7-dinitrobenzoxazole and 2-ethyl-5,7-dinitrobenzoxazole were dispersed in a commercial poultry mash to produce medicated feed compositions containing various concentrations of one of the agents. These medicated compositions and unmodified mash were fed as a sole ration to flocks of chickens of the same history and past environment. Each flock consisted of 250 birds which were nine days old. The flocks were kept in separate rearing pens and maintained on cane litter. During the fifteenth and sixteenth days following the initiation of the diets, the birds were fed as a part ration, a poultry mash which had been heavily inoculated with the sporulated oöcysts of *Eimeria tenella* and *Eimeria necatrix*. In such operations, the birds were fed an amount of the part ration sufficient to provide 200,000 oöcysts per bird. Twenty-five days after the initiation of the diets, the birds were weighed and the average weight per bird for each test group determined. Any of the birds which died during the determination were autopsied and the cause of death determined. The average weight per bird and the number of deaths from coccidiosis for each test group are set forth in the following table:

| Test Compound | Percent by Weight of Test Compound in Mash | Average Weight per Bird in Grams | | Percent Mortality from Coccidiosis |
|---|---|---|---|---|
| | | Beginning of determination | End of determination | |
| 2-methyl-5,7-dinitrobenzoxazole | 0.025 | 91 | 407 | 4.1 |
| | 0.037 | 90 | 458 | 2.5 |
| | 0.05 | 92 | 488 | 4.0 |
| 2-ethyl-5,7-dinitrobenzoxazole | 0.025 | 92 | 432 | 0.8 |
| | 0.0375 | 90 | 439 | 1.3 |
| | 0.05 | 90 | 480 | 0 |
| Check (Flock receiving unmodified mash) | | 91 | 344 | 46.7 |

*Example 6*

Ninety parts by weight of 2-ethyl-5,7-dinitrobenzoxazole is mechanically ground with 10 parts of bentonite to produce a medicated feed composition.

In a similar manner, a medicated feed composition is prepared by grinding together 50 parts by weight of 2-propyl-5,7-dinitrobenzoxazole, 1 part of a sorbitan monopalmitate (Spann 20) and 49 parts of aluminum magnesium silicate (attapulgite).

In a further operation, 10 parts by weight of 2-n-butyl-5,7-dinitrobenzoxazole is dispersed in 90 parts of cottonseed oil to prepare a composition in the form of an edible liquid.

In an additional operation, 20 parts by weight of 2-bromomethyl-5,7-dinitrobenzoxazole is mechanically mixed with 80 parts of soy bean meal to prepare a medicated animal feed.

These compositions are adapted to be fed to animals to supply the desired dosage of benzoxazole compound or to be employed as concentrates and subsequently diluted with additional edible carrier to produce animal feeds containing the desired amount of active agent.

The benzoxazole compounds as employed in accordance with the present invention may be prepared by reacting picramic acid with a haloacetic anhydride or a lower alkanoic anhydride such as acetic anhydride, bromoacetic anhydride, propionic anhydride, butyric anhydride and pentanoic anhydride. The reaction is carried out in the presence of a dehydration catalyst such as sulfuric acid or benzene sulfonic acid. Good results are obtained when employing at least two molecular proportions of the anhydride reagent with each molecular proportion of picramic acid. The reaction conveniently may be carried out in a solvent such as toluene or the acid from which the anhydride reagent may be prepared.

In carrying out the reaction, the picramic acid, anhydride, catalyst and solvent, if employed, are mixed together and the resulting mixture heated for a period of time at a temperature of from 75° to 170° C. to complete the reaction. The heating may be carried out at the boiling temperature of the reaction mixture, either under reflux or with distillation of solvent, if employed, or of alkanoic acid produced in the reaction. Upon completion of the reaction, the desired product may be separated in conventional fashion such as filtration and extraction with a solvent such as acetone or petroleum ether. Certain of these benzoxazole compounds are claimed per se and a method for their preparation disclosed in an application of Robert O. Dorton, Serial No. 466,435, filed concurrently herewith now U. S. Letters Patent No. 2,746,971.

I claim:

1. A method which comprises feeding an animal a composition comprising as an active ingredient a benzoxazole of the formula

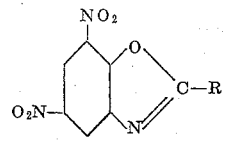

wherein R represents a member of the group consisting of halomethyl and loweralkyl containing from 1 to 3 carbon atoms, inclusive, in intimate admixture with an innocuous ingestible adjuvant, the composition being fed in an amount sufficient to provide a daily dosage of from 35 to 2,000 milligrams of the benzoxazole compound per kilogram of body weight.

2. In the practice of animal husbandry, the method which comprises feeding animals a benzoxazole of the formula

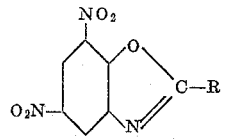

wherein R represents a member of the group consisting of halomethyl and loweralkyl containing from 1 to 3 carbon atoms, inclusive, the benzoxazole being fed at a daily dosage of from 35 to 2,000 milligrams per kilogram of body weight.

3. A method claimed in claim 2 wherein the daily dosage of the benzoxazole is from 35 to 500 milligrams per kilogram of body weight.

4. A method claimed in claim 3 wherein the benzoxazole is 2-methyl-5,7-dinitrobenzoxazole.

5. A method claimed in claim 3 wherein the benzoxazole is 2-ethyl-5,7-dinitrobenzoxazole.

6. A method claimed in claim 3 wherein the benzoxazole is a 2-propyl-5,7-dinitrobenzoxazole.

7. An animal feed containing from 5 to 95 percent by weight of a benzoxazole of the formula

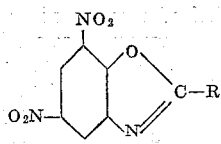

wherein R represents a member of the group consisting of halomethyl and loweralkyl containing from 1 to 3 carbon atoms, inclusive.

8. A concentrate composition comprising from 5 to 95 percent by weight of a benzoxazole of the formula

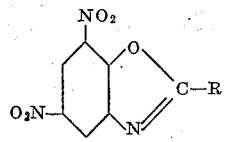

wherein R represents a member of the group consisting of halomethyl and loweralkyl containing from 1 to 3 carbon atoms, inclusive, in intimate admixture with an edible finely divided solid.

9. An animal feed containing from 0.01 to 0.4 percent by weight of a benzoxazole of the formula

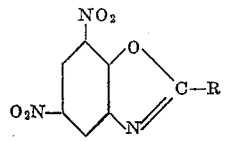

wherein R represents a member of the group consisting of halomethyl and loweralkyl containing from 1 to 3 carbon atoms, inclusive.

10. A poultry feed containing from 0.01 to 0.4 percent by weight of 2-methyl-5,7-dinitrobenzoxazole.

11. A poultry feed containing from 0.01 to 0.4 percent by weight of 2-ethyl-5,7-dinitrobenzoxazole.

12. A poultry feed containing 0.01 to 0.4 percent by weight of 2-propyl-5,7-dinitrobenzoxazole.

13. A concentrate composition comprising from 5 to 95 percent by weight of 2-ethyl-5,7-dinitrobenzoxazole in intimate admixture with an edible finely divided solid.

References Cited in the file of this patent

UNITED STATES PATENTS

| | | |
|---|---|---|
| 2,628,183 | Johnson | Feb. 10, 1953 |
| 2,746,971 | Dorton | May 22, 1956 |

OTHER REFERENCES

Pearl et al.: J. A. C. S., vol. 60, Jan.-June 1938, pp. 925–927.